(12) United States Patent
Iwaguchi et al.

(10) Patent No.: US 7,044,382 B2
(45) Date of Patent: May 16, 2006

(54) BAR-CODE READER AND COMPUTER PRODUCT

(75) Inventors: Isao Iwaguchi, Tokyo (JP); Kozo Yamazaki, Tokyo (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 0 days.

(21) Appl. No.: 11/003,007

(22) Filed: Dec. 3, 2004

(65) Prior Publication Data

US 2005/0150958 A1 Jul. 14, 2005

Related U.S. Application Data

(63) Continuation of application No. PCT/JP02/06650, filed on Jun. 28, 2002.

(51) Int. Cl.
G06K 19/06 (2006.01)
G06K 7/10 (2006.01)

(52) U.S. Cl. .............................. 235/462.16; 235/462.01
(58) Field of Classification Search ........... 235/462.16, 235/462.01, 462.07, 462.25
See application file for complete search history.

(56) References Cited

U.S. PATENT DOCUMENTS

| | | | |
|---|---|---|---|
| 4,421,978 A | 12/1983 | Laurer et al. | |
| 5,194,720 A | 3/1993 | Reinnagel et al. | |
| 5,438,188 A | 8/1995 | Surka | |
| 5,854,478 A * | 12/1998 | Liu et al. ................ | 235/462.27 |
| 5,942,740 A * | 8/1999 | Watanabe et al. ....... | 235/462.07 |
| 6,299,064 B1 * | 10/2001 | Watanabe et al. ....... | 235/462.16 |
| 6,357,660 B1 * | 3/2002 | Watanabe et al. ....... | 235/462.16 |
| 6,386,454 B1 * | 5/2002 | Hecht et al. ............ | 235/462.16 |
| 6,445,450 B1 * | 9/2002 | Matsumoto ............. | 356/401 |
| 6,478,223 B1 * | 11/2002 | Ackley .................. | 235/462.04 |
| 2002/0074407 A1 * | 6/2002 | Koyanagi et al. ....... | 235/462.16 |

FOREIGN PATENT DOCUMENTS

| | | |
|---|---|---|
| JP | 57-148243 | 9/1982 |
| JP | 58-82370 | 5/1983 |
| JP | 61-290577 | 12/1986 |
| JP | 4-128983 | 4/1992 |
| JP | 5-508505 | 11/1993 |
| JP | 2775348 | 5/1998 |
| JP | 2793453 | 6/1998 |
| JP | 2001-147986 | 5/2001 |

* cited by examiner

*Primary Examiner*—Thien M. Le
*Assistant Examiner*—Edwyn Labaze
(74) *Attorney, Agent, or Firm*—Armstrong, Kratz, Quintos, Hanson & Brooks, LLP.

(57) ABSTRACT

In a bar-code reader, a reading unit reads characters from a bar code, based on parameters. A storing unit stores a plurality of signal-waveform information corresponding to a plurality of character patterns. A selecting unit makes an operator select a correct-reading character from among a plurality of the characters, if there is an occurrence of a wrong reading. A comparing unit compares a pattern corresponding to the correct-reading character selected and a pattern acquired from a plurality of signal-waveform information while changing the parameters one by one. Based on a comparison result, a parameter-setting unit sets in the reading unit, the parameters for which the occurrence of the wrong reading is least.

9 Claims, 18 Drawing Sheets

FIG.4

| n | WAVEFORM PATTERN | MODULE FREQUENCY | CORRECT-READING TERNARIZED PATTERN | WRONG-READING TERNARIZED PATTERN |
|---|---|---|---|---|
| 0 | ~ | 2100kHz | 1,0,0,-1,0,1,-1,1,... | — |
| 1 | ~ | 1300kHz | 1,-1,1,0,0,-1,0,1...... | — |
| 2 | ~ | 2100kHz | 1,-1,1,0,-1,0,0,1 | 1,-1,0,1,0,-1,0,0,1 |
| .. | | .. | .. | .. |
| N | ~ | 1000kHz | 0,1,-1,1,-1,0,0,1...... | — |
| N' | ~ | 2500kHz | 0,1,-1,1,-1,0,0,1 | 0,1,-1,0,0,1,-1,1,... |

60, 60₀, 60₁, 60₂, 60_N, 60_N'

$$\text{CORRELATION VALUE } Cr[n] = \sum_{t=0}^{T} [xn(t) \cdot yn(T-t)]$$

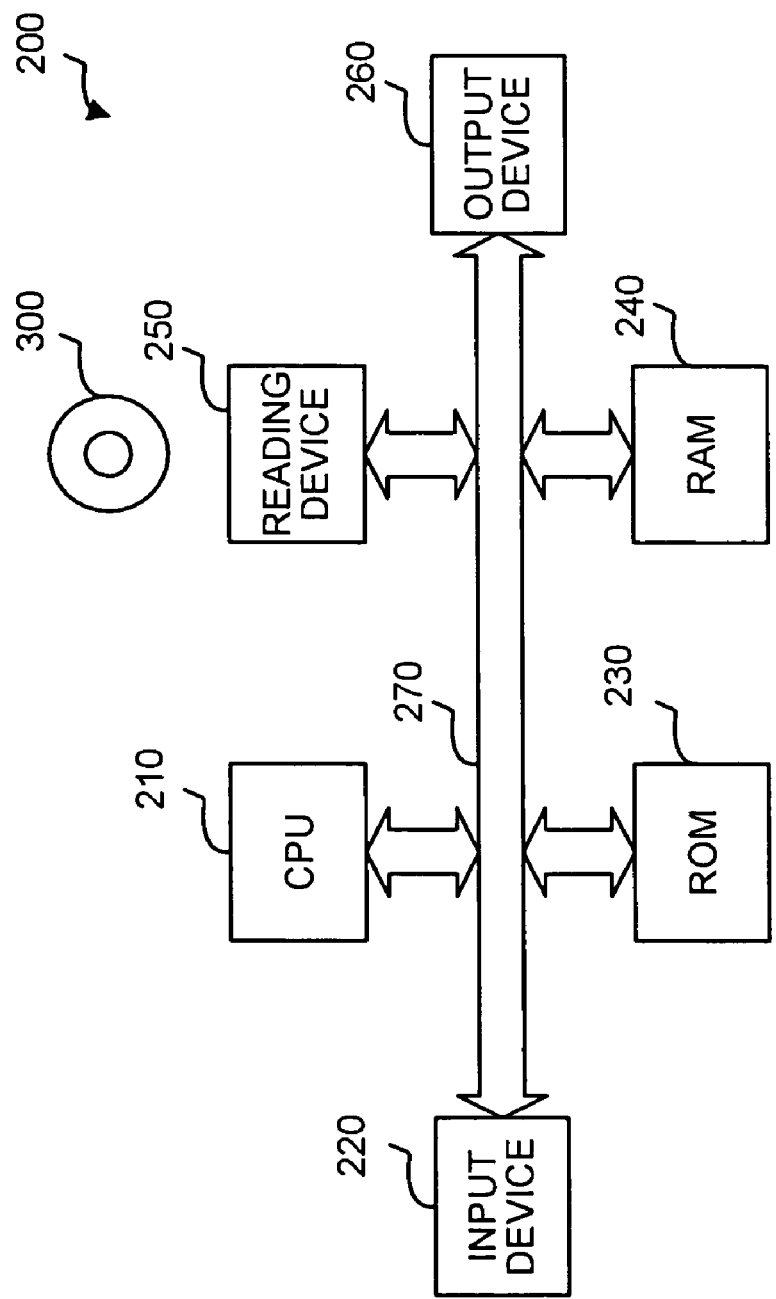

BAR-CODE READER AND COMPUTER PRODUCT

This application is a continuation of international application PCT/JP02/06650 filed Jun. 28, 2002.

BACKGROUND OF THE INVENTION

1) Field of the Invention

The present invention relates to a bar-code reader and a computer product that read a bar-code with improved accuracy.

2) Description of the Related Art

Conventionally, in a field of products distribution, a bar-code provided on a product is read optically, and information related to the product such as a price and a name of the product is recorded in a register.

In a bar code, information related to a product is encoded as characters, and is a combination of alternate black and white bars. In a bar-code reader, light beam emitted from a laser diode is made to scan the bar code, reflected light of the beam is received, and bar-code information is read from an electric signal corresponding to width of black bars and white bars.

The bar code is printed on various media such as an organic material, a can, and paper. Therefore, in conventional bar code printing, depending on the medium, there may occur an error in width of bars due to stains during distribution or due to blurring. Errors in width of the bar result in erroneous reading by the bar-code reader.

Therefore, the bar-code reader is shipped from its manufacturing factory in a condition with a tolerance such that setting conditions of parameters necessary for reading the bar-code are relaxed for a standardized width error.

However, after the shipment of the bar-code reader, there are often inferior bar codes that have a width error beyond specifications. In such a case, the bar-code cannot be read no matter for how long it is scanned, and an operator has to input bar-code information. Consequently, that takes too much of operation time.

Moreover, if the frequency of inability to read the inferior bar code increases, a user of the bar-code reader complains to a manufacturer. The manufacturer has to send a person-in-charge to a site to investigate and take measures, or to carry the bar-code reader to the manufacturer for thorough investigation and take measures, thereby causing a demerit to both the user and the manufacturer.

SUMMARY OF THE INVENTION

The present invention is made in view of such problems. It is an object of the present invention to provide a bar-code reader and computer product for reading bar code that enable to improve the reading accuracy automatically.

A bar-code reader according to an aspect of the present invention includes a reading unit that reads characters from a bar code, based on parameters, a storing unit that stores a plurality of signal-waveform information corresponding to a plurality of character patterns, a selecting unit that makes an operator select a correct-reading character from among a plurality of the characters, when there is an occurrence of a wrong reading, a comparing unit that compares a pattern corresponding to the correct-reading character selected and a pattern acquired from a plurality of signal-waveform information while changing the parameters one by one, and a parameter-setting unit that sets in the reading unit, parameters for which the occurrence of the wrong reading is least, based on a comparison result of the comparing unit.

Moreover, a computer-readable recording medium according to another aspect of the present invention records therein instructions which, when executed, cause a computer to execute reading characters from a bar code, based on parameters, storing a plurality of signal-waveform information corresponding to a plurality of character patterns, a selecting that includes making an operator select a correct-reading character from among a plurality of the characters, when there is an occurrence of a wrong reading, comparing a pattern corresponding to the correct-reading character selected and a pattern acquired from a plurality of signal-waveform information while changing the parameters one by one, and setting in a reading unit, the parameters for which the occurrence of the wrong reading is least, based on a comparison result of the comparing.

Thus as described above, according to the present invention, when there is an occurrence of wrong reading of characters of a bar code, the operator is made to select the correct-reading character from the plurality of characters. Because the pattern for which the occurrence of wrong reading is the least is set based on the comparison result of the pattern corresponding to the correct-reading character and the pattern acquired from the plurality of signal-waveform information while changing the parameters one by one, the reading accuracy improves automatically even while the bar code reader is being used.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 4 illustrates a learning-information database shown in FIG. 1;

FIG. 19 is a block diagram of a modified configuration of the first to fourth embodiments.

DETAILED DESCRIPTION

Exemplary embodiments of a bar-code reader according to the present invention are described below in detail with reference to the accompanying diagrams.

Figure 1:
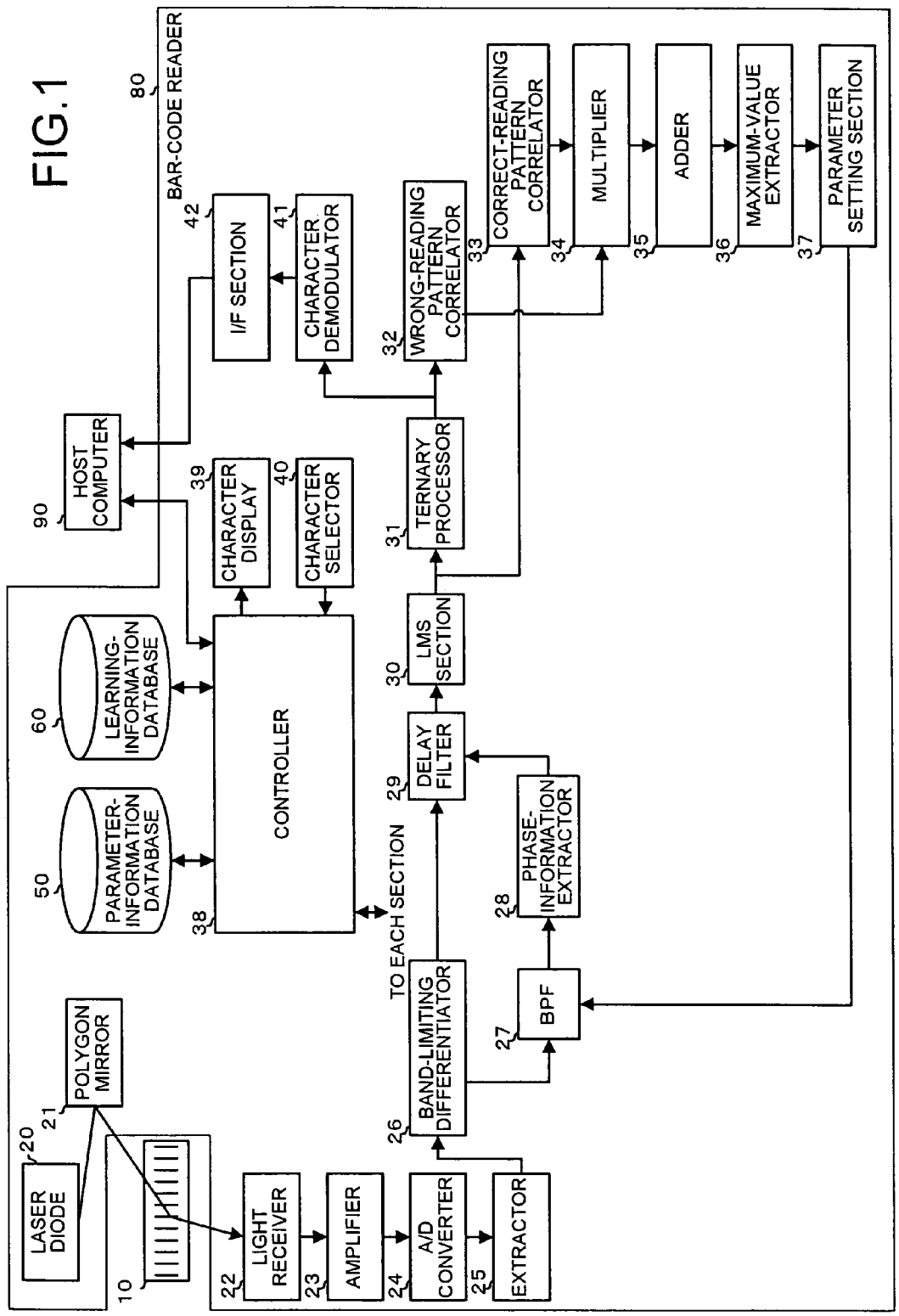
FIG. 1 is block diagram of a configuration according to a first embodiment the present invention.

FIG. 1 is a block diagram of a configuration of a first embodiment according to the present invention. A bar-code reader 80 reads a bar code 10 optically, and using a learning-function after the shipment, sets automatically the most suitable parameters.

Module frequency error $\Delta f$, bandwidth fw, and roll-off factor ROF shown in FIG. 2 and FIG. 3 (described later), can be named as the parameters.

In the bar-code reader 80, a laser diode 20 emits a light beam for scanning. A polygon mirror 21 includes a mirror that causes the light beam from the laser diode 20 to reflect. The polygon mirror is rotated by a motor (omitted in the diagram), and imparts scanning patterns of a plurality of types by changing a direction of reflection of the light beam.

A light beam reflected from the polygon mirror 21 is irradiated on black bars and white bars on the bar code 10, for example from a left end to a right end. A light receiver 22 receives reflected light of the light beam irradiated on the bar code 10, and performs photoelectric conversion of amplitude to an electric signal, based on an intensity of the light received. An amplifier 23 amplifies the signal subjected to photoelectric conversion by the light receiver 22.

An A/D (Analog/Digital) converter 24 performs digital sampling of an analog signal subjected to photoelectric conversion and amplified by the amplifier 23, and outputs as a digital photoelectric signal. An extractor 25 extracts only a signal that is reflected from the bar code 10, from among the signal subjected to photoelectric conversion from the A/D converter 24, to reduce signal processing in subsequent stages.

Figure 3:
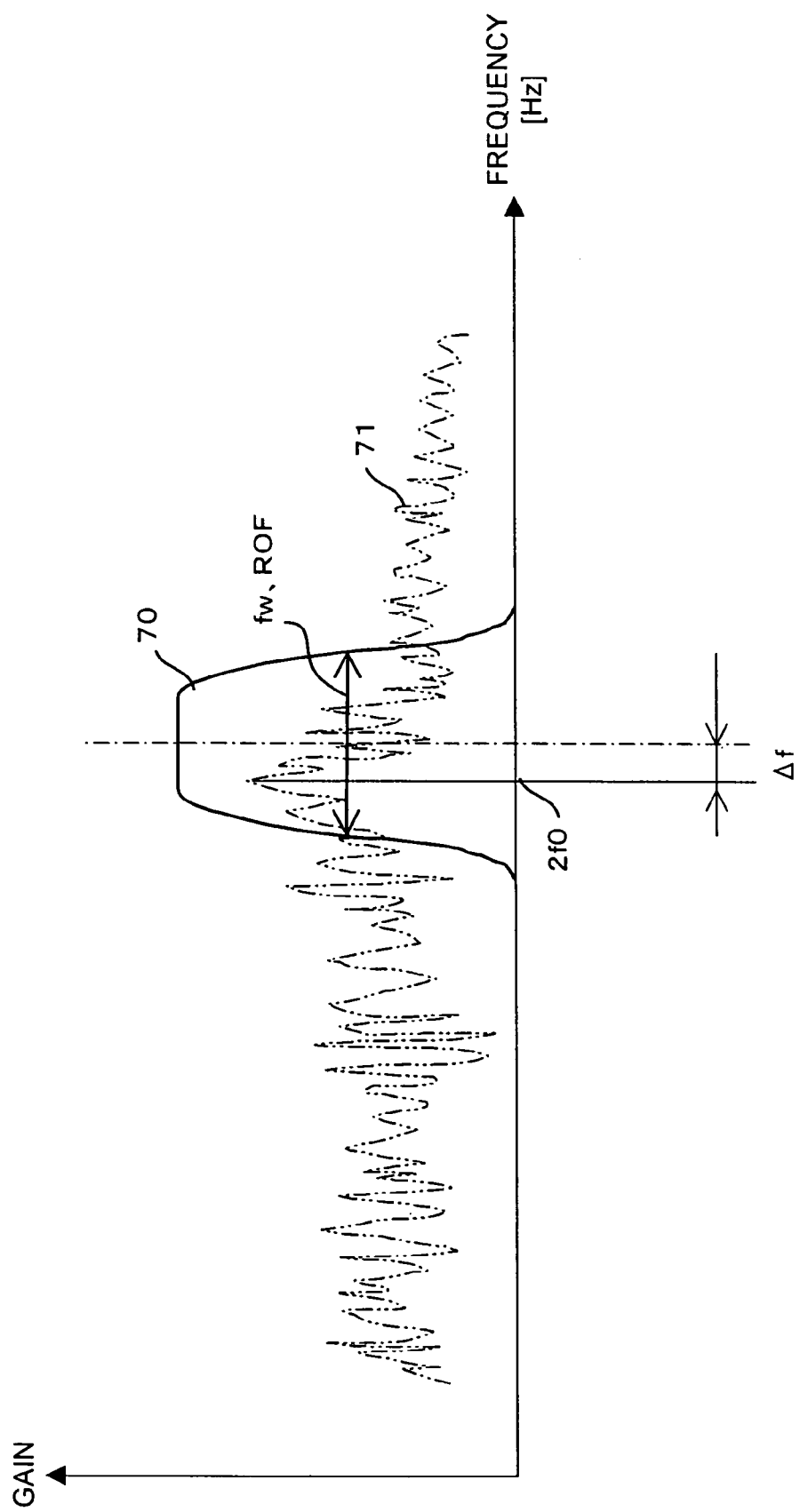
FIG. 3 is a diagram describing parameters.

A band-limiting differentiator 26 performs processes such as a differentiation process and a squaring process of a signal output by the extractor 25, obtains a frequency spectrum 71 shown in FIG. 3 by an FFT (Fast Fourier Transform) process of the differentiated-squared signal, and calculates frequency of a gain peak of the frequency spectrum 71 as a module frequency (2f0) equivalent to a basic module of the bar code.

Figure 5:
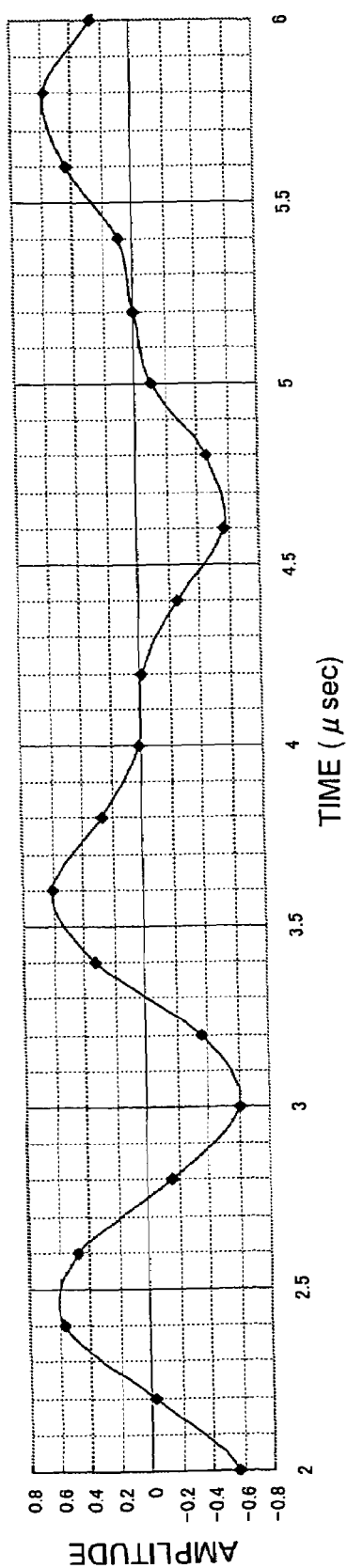
FIG. 5 illustrates an output of a band-limiting differentiator.

The band-limiting differentiator 26, by using the above-mentioned module frequency, performs a differentiation process for limiting a band of the signal output from the extractor 25, and outputs a signal having a waveform pattern shown in FIG. 5.

Figure 6:
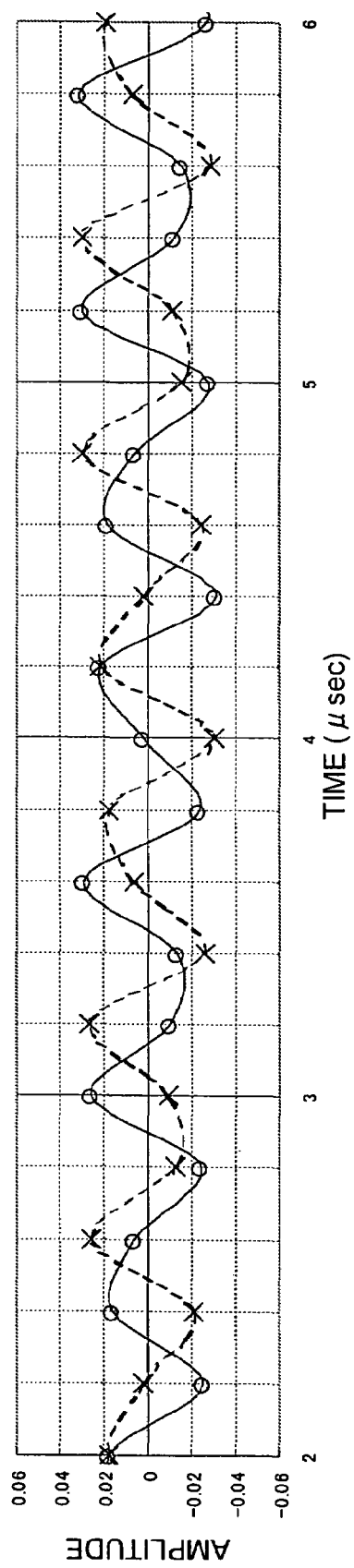
FIG. 6 illustrates an output of a BPF shown in FIG. 1.

Based on a filter characteristic 70 shown in FIG. 3, a BPF (Band Pass Filter) 27 filters the signal of the waveform pattern shown in FIG. 5, and outputs a waveform pattern shown in FIG. 6. A parameter setting section 37 (described later) dynamically sets in the BPF 27, the module frequency error $\Delta f$, the bandwidth fw, and the roll-off factor ROF, as parameters that determine the filter characteristic 70. These parameters are important values that decide a reading accuracy of the bar code. Therefore, if the parameters are not set to suitable values, an error tends to occur while reading the bar code.

The module frequency error $\Delta f$ is a value for correcting an error in the module frequency (2f0) (described later). Therefore, practically, as shown in FIG. 3, a center frequency of the filter characteristic 70 (bandwidth fw) becomes module frequency (2f0)+module frequency error $\Delta f$.

Moreover, according to the first embodiment, when there is a wrong reading while reading a bar code, a set for which the wrong reading is the most difficult to occur is selected from among sets of a plurality of parameters (refer to FIG. 2), and parameters corresponding to this set are set in the BPF 27.

In FIG. 6, a waveform with circles at sample points corresponds to a real part where a Hilbert conversion is performed, and a waveform with cross marks at sample points corresponds to an imaginary part. Thus, in FIG. 6, each sample point is vectorized (the real part and the imaginary part).

Figure 7:
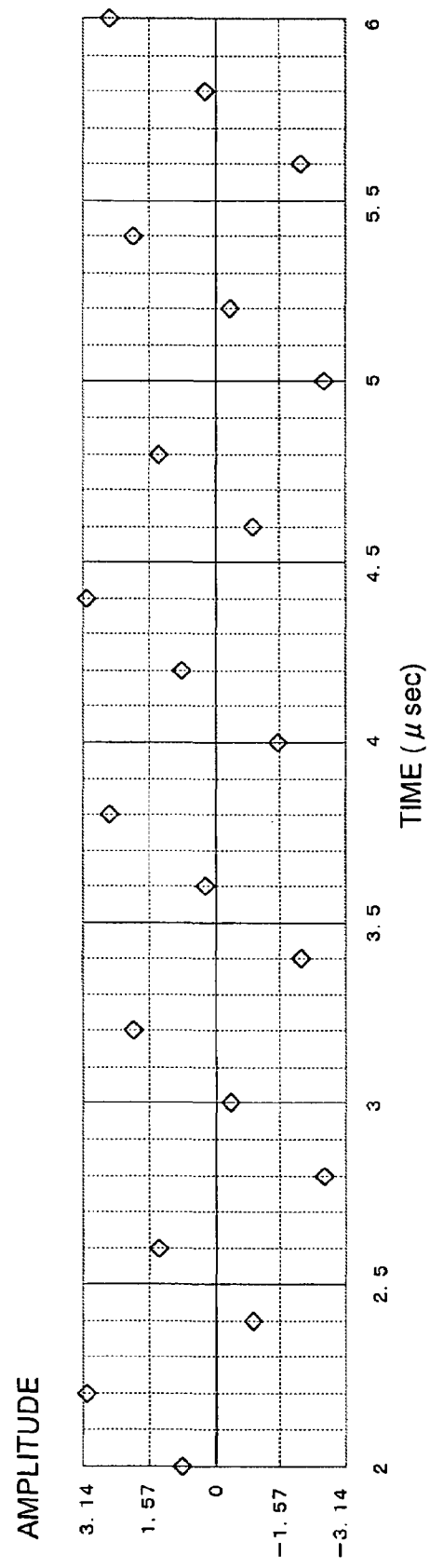
FIG. 7 illustrates an output of a phase-information extractor shown in FIG. 1.

The phase-information extractor 28 extracts a phase of each sampling point in FIG. 6, and with a point where the phase is zero radian as a module timing, outputs a module timing information as shown in FIG. 7.

Figure 8:
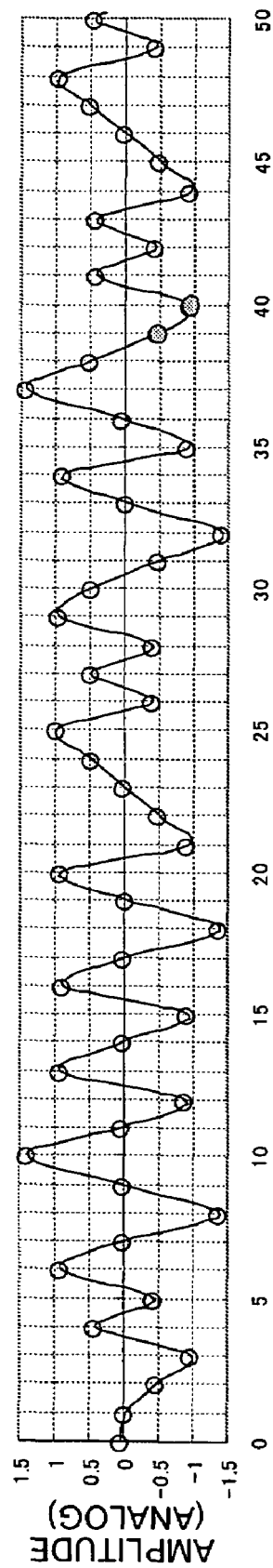
FIG. 8 illustrates an output of a delay filter shown in FIG. 1.

Based on a delay time of the point of zero radian in FIG. 6 and the sample point, the delay filter 29 performs delaying process on a signal output from the band-limiting differentiator 26, causes the sample point to coincide with the zero radian timing point, and outputs a waveform pattern such as that shown in FIG. 8.

Figure 9:
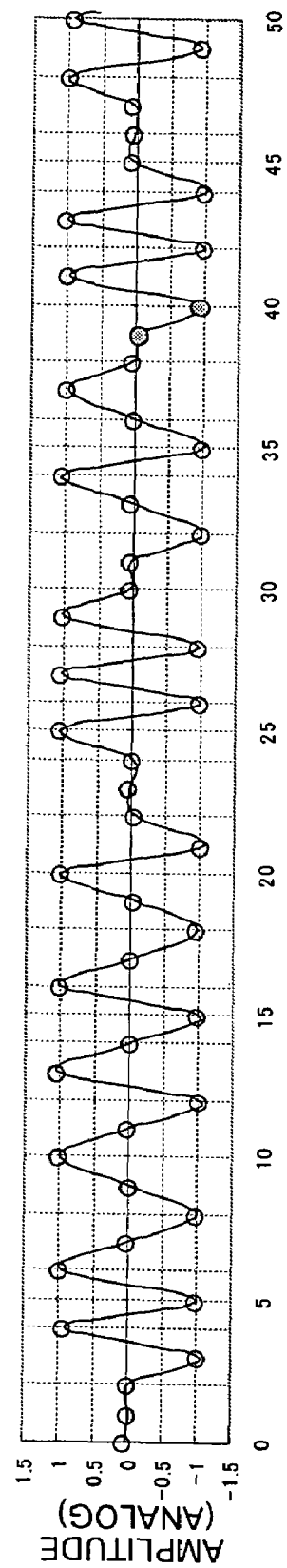
FIG. 9 illustrates an output of an LMS section (correct reading) shown in FIG. 1.
Figure 10:
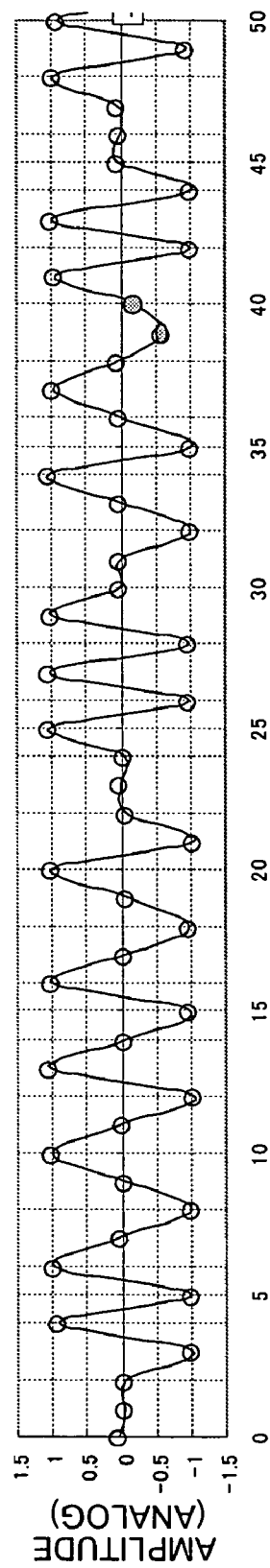
FIG. 10 illustrates an output of an LMS section (wrong reading) shown in FIG. 1.

An LMS (Least Mean Square) section 30 performs an equalization process on an output signal from the delay filter 29 by a method of least squares, and outputs a signal of waveform patterns shown in FIG. 9 (correct reading) and FIG. 10 (wrong reading).

Figure 11:
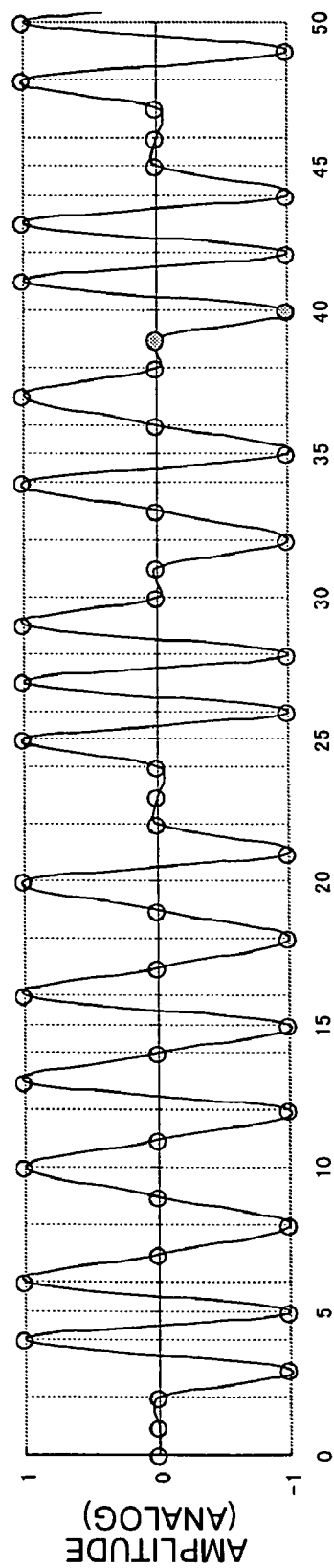
FIG. 11 illustrates an output of a ternary processor shown in FIG. 1 and a correct-reading ternarized pattern.
Figure 12:
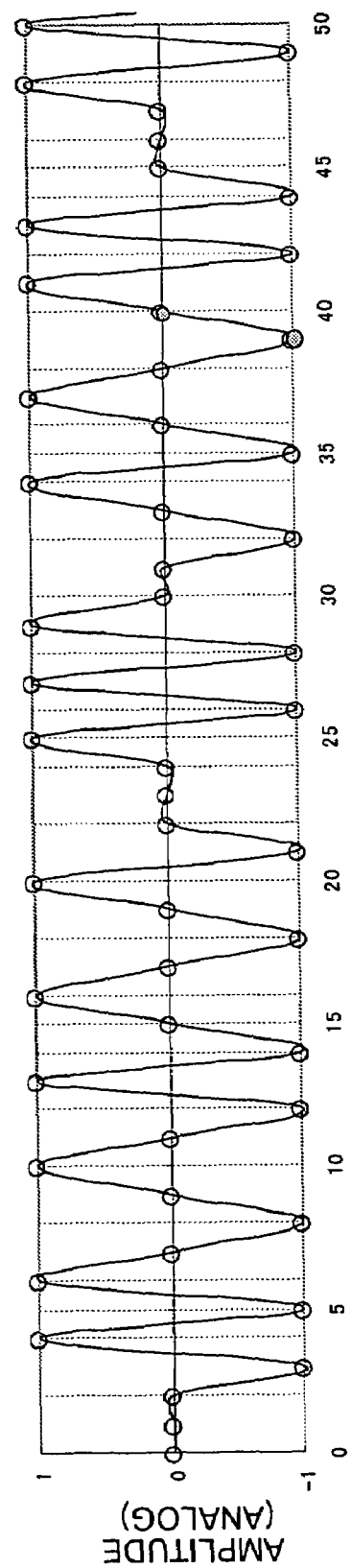
FIG. 12 illustrates an output of the ternary processor and a wrong-reading ternarized pattern.
Figure 13A:
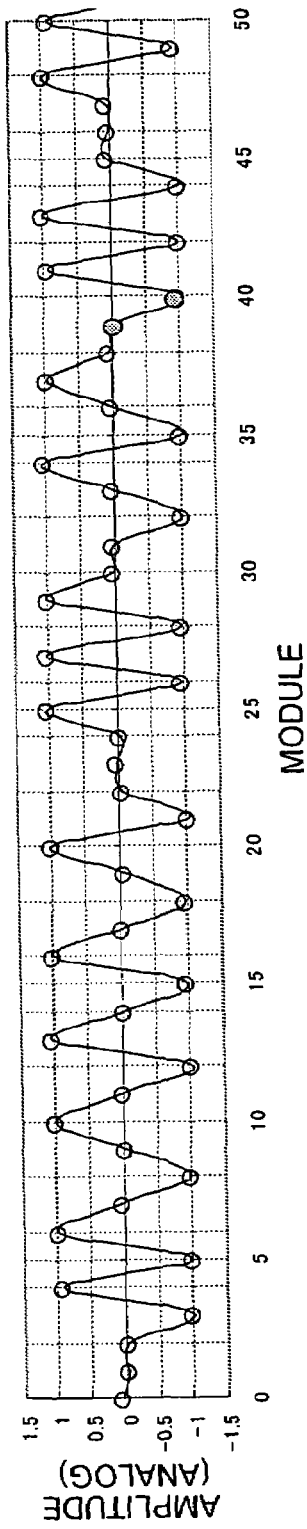
FIG. 13 illustrates a ternarized pattern and a character pattern.
Figure 13B:
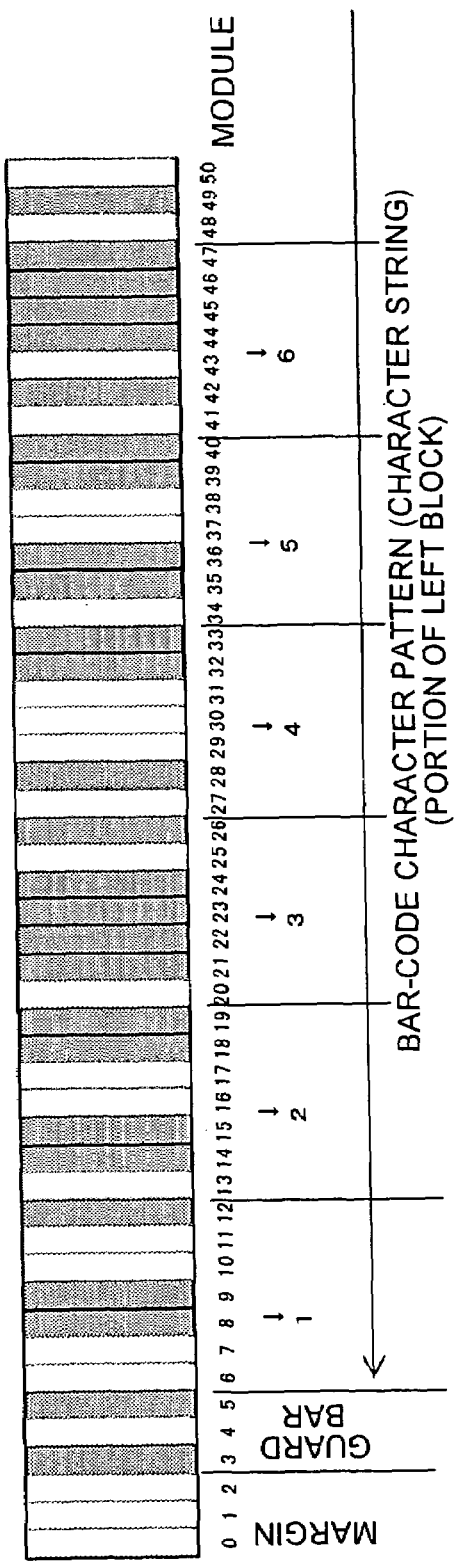

Based on a comparison of amplitude and threshold value, a ternary processor 31 ternarizes an output of the LMS section 30 (refer to FIG. 9 and FIG. 10) to any one of "+1", "0" or "−1", and outputs ternarized information of circled portions shown in FIG. 11 and FIG. 12. As an example, a character demodulator 41 demodulates ternarized information of the circled portions shown in FIG. 13(a) to character pattern (character string) of the bar code shown in FIG. 13(b). This character pattern is transmitted as a reading result to a host computer 90 via an I/F (interface) section 42.

FIG. 11 illustrates a ternarized pattern when reading correctly. FIG. 12 illustrates a ternarized pattern when reading wrongly. In other words, in FIG. 11, ternarized information of a point with a horizontal co-ordinate=40 and of a sampling point just before that (a black circle) is "−1" and "0", and is read correctly. Whereas, in FIG. 12, in spite of reading the same bar code, the same sampling points (the black circle) are read wrongly as "0" and "−1".

In the bar-code reader 80 shown in FIG. 1, due to blurring etc. of the bar code, as shown in FIG. 11 and FIG. 12, there is a case where two results (reading correctly and reading wrongly) are obtained as a result of reading one bar code. In such a case, the two results are shown to an operator and the correct result is selected.

A wrong-reading pattern correlator 32 calculates a correlation value of an output of the ternary processor 31 and a wrong-reading ternarized pattern in learning information stored in a learning-information database 60 (described later). A correct-reading pattern correlator 33 creates a reference ternarized pattern from the correct-reading character pattern selected by the operator mentioned above, and calculates a correlation value of the reference ternarized pattern and the output of the LMS section 30.

A multiplier 34 multiplies the correlation value from the correct-reading pattern correlator 33 and the correlation value from the wrong-reading pattern correlator 32. An adder 35 adds the products for each parameter output by the multiplier 34, to obtain a correlation-sum. A maximum-value extractor 36 extracts a maximum value from among a plurality of correlation-sums calculated.

A parameter setting section 37 sets in the BPF 27, parameters corresponding to the maximum value extracted by the maximum-value extractor 36. A controller 38 controls each section. Under a control of the controller 38, a character display 39 displays a bar-code reading result (characters) based on the output of the ternary processor 31.

In case of the correct-reading result and the wrong-reading result as shown in FIG. 11 and FIG. 12, both the reading results are displayed on the character display 39. A character selector 40 is provided with a function that makes the operator select the correct-reading result when both the reading results are displayed on the character display 39. Concretely, from among two characters that are displayed on the character display 39, the operator selects that character as the correct-reading result, which coincides with character displayed near the bar code.

A parameter-information database 50 stores parameter information related to the parameters module frequency error Δf, bandwidth fw, and roll-off factor ROF, which affect the reading accuracy of the bar code.

Figure 2:
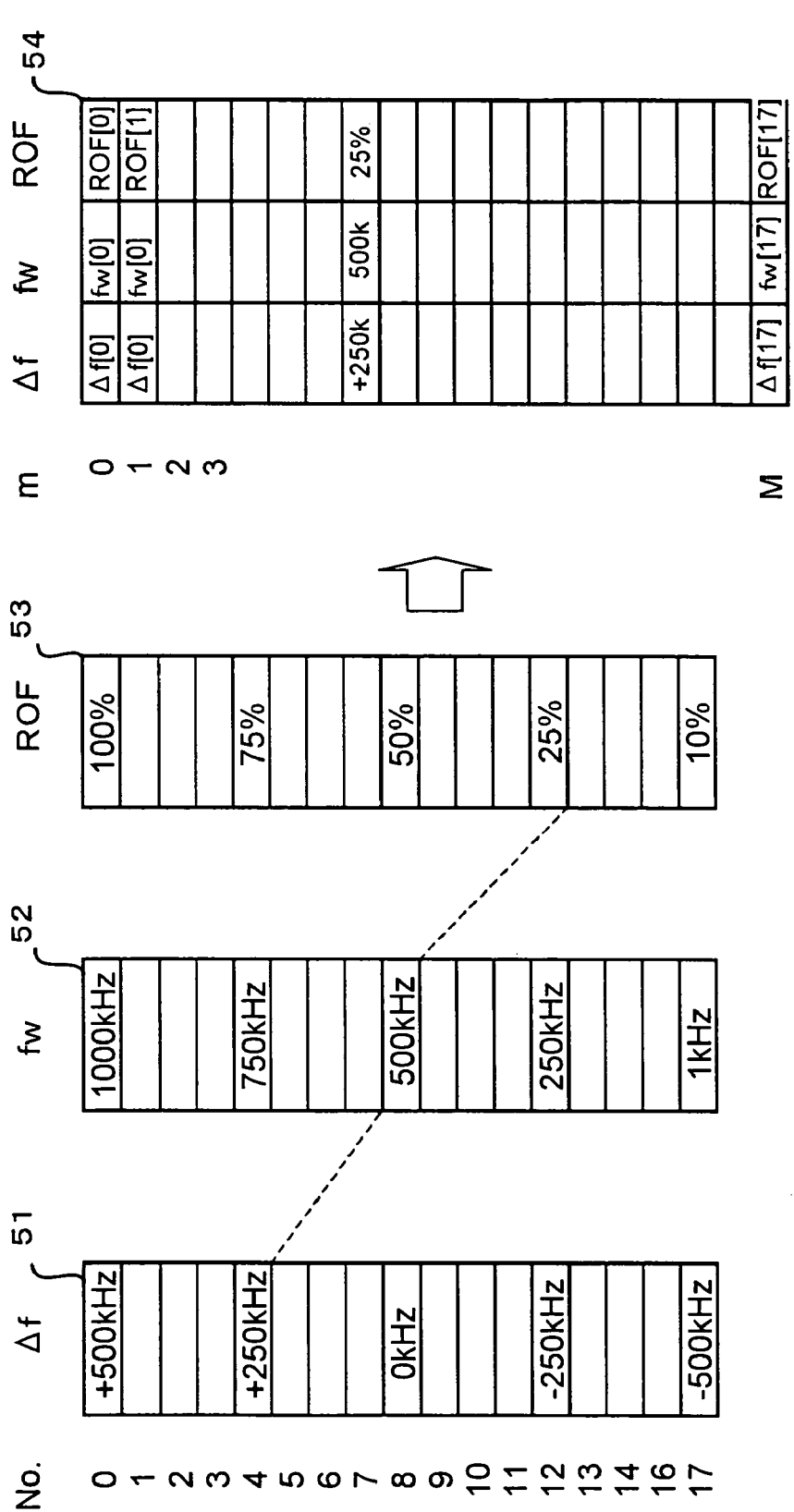
FIG. 2 illustrates a parameter-information database shown in FIG. 1.

Concretely, the parameter-information database 50, as shown in FIG. 2, includes a module frequency error table 51, a bandwidth table 52, and roll-off factor table 53, and a parameter-set table 54.

The module frequency error table 51 is a set of module frequency errors Δf at a prescribed interval in a prescribed range from a lower limit to an upper limit (for example, from −500 kHz to +500 kHz). The bandwidth table 52 is a set of bandwidths fw in a prescribed range from a lower limit to an upper limit (for example, from 1 kHz to 1000 kHz). The roll-off factor table 53 is a set of roll-off factors in a prescribed range from a lower limit to an upper limit (for example, from 0% to 100%).

The parameter-set table 54 is a set of parameters (module frequency error Δf, bandwidth fw, and roll-off factor ROF) with one parameter each extracted from the module frequency error table 51, the bandwidth table 52, and the roll-off factor table 53. All combinations (m=0 to M) are stored in the parameter-set table 54.

The learning-information database 60, as shown in FIG. 4, stores learning information of records from $60_0$ to $60_{N'}$. The learning information includes number, waveform pattern, module frequency, correct-reading ternarized pattern, and wrong-reading ternarized pattern, is used while selecting a parameter that is reset when there is a wrong reading, and a plurality of the information is predefined. The waveform pattern is information of a waveform pattern that is input to the band-limiting differentiator 26.

The module frequency corresponds to the concerned waveform pattern. The correct-reading ternarized pattern is an output of the ternary processor 31 (correct reading) when the concerned waveform pattern is input to the band-limiting differentiator 26.

On the other hand, the wrong-reading ternarized pattern is an output (wrong reading) of the ternary processor 31 when the abovementioned pattern is input to the band-limiting differentiator 26. Here, when the bar-code reading result is wrong reading, learning information corresponding to the new reading result is stored in the learning-information database 60.

A host computer 90 is connected to the bar-code reader 80 and performs product management etc. based on the bar-code reading result.

Next, an operation of the first embodiment is described with reference to a flowchart shown in FIG. 14. At step SA1, the controller 38 judges whether new learning information is added to the learning-information database 60. In this case, a judgment result is "No" and the same judgment is repeated.

The condition for adding the learning information is that the bar-code reading by the bar-code reader 80 is not possible. In other words, when there are to types of reading results, the correct-reading ternarized pattern and the wrong-reading ternarized pattern, or when the character pattern transmitted from the I/F section 42 is not registered in the host computer 90, the character selector 40 selects the correct-reading.

When the bar code 10 is held against the light beam by the operator, the light receiver 22 receives light reflected from the bar code 10, and performs the photoelectric conversion of amplitude to an electric signal according to the intensity of the light received. The signal subjected to photoelectric conversion is amplified by the amplifier 23, is digitized in the A/D converter 24, and further extracted in the extractor 25.

Next, the band-limiting differentiator 26 performs processes such as differentiation process and squaring process on the output signal from the extractor 25, obtains a frequency spectrum by the FFT process of the differentiated-squared signal, and calculates the frequency of the gain peak of the frequency spectrum as the module frequency (2f0) equivalent to a basic module of the bar code.

Moreover, the band-limiting differentiator 26, using the abovementioned module frequency, performs the differentiation process for limiting the band of the output signal from the extractor 25, and outputs the signal of the waveform pattern to the BPF 27 and the delay filter 29.

Next, based on the module frequency (2f0) calculated in the band-limiting differentiator 26 and the parameters set in advance (module frequency error Δf, bandwidth fw, and roll-off factor ROF), the BPF 27 filters the signal of the waveform pattern.

The phase-information extractor 28 extracts a phase of each sampling point in the output of the BPF 27, and letting the point where the phase is zero radian to be the module timing, outputs the module timing information.

Next, based on the delay time of the point of zero radian and the sample point, the delay filter 29 performs delaying process of the signal from the band-limiting differentiator 26, causes the sample point to coincide with the zero radian timing point, and outputs the waveform pattern shown in FIG. 8 to the LMS section 30.

By doing so, the LMS section 30 performs the equalization process on the output signal from the delay filter 29, by a method of least squares. In this case, if the bar code 10 is an inferior bar code, the LMS section 30 outputs the signal of each waveform pattern shown in FIG. 9 (when reading correctly) and FIG. 10 (when reading wrongly).

Based on the comparison of amplitude and threshold value, the ternary processor 31 ternarizes the output of the LMS section 30 to any one of "+1", "0", and "−1", and outputs ternarized information of two types for correct reading and wrong reading. In other words, if the bar code 10 is an inferior bar code, two reading results are obtained, and with the parameters set in the BPF 27 at present, the bar code reader 80 is not able to read the bar code properly.

Therefore, the controller 38 displays the reading results of two types from the ternary processor 31 on the character display 39. The operator makes a judgment of inability to read, and selects in the character selector 40, that character as the correct-reading result, which coincides with the character displayed near the bar code, from among the two types of reading results displayed on the character display 39.

Next, the controller 38 adds the waveform pattern (the output from the band-limiting differentiator 26), the module frequency (the output from the band-limiting differentiator 26), the correct-reading ternarized pattern (output from the ternary processor 31 and selected in the character selector 40), and the wrong-reading ternarized pattern (output from the ternary processor 31 and selected in the character selector 40) corresponding to the bar code 10, into the record $60_{N'}$ of the learning-information database 60 as the new learning information as shown in FIG. 4.

Figure 14:
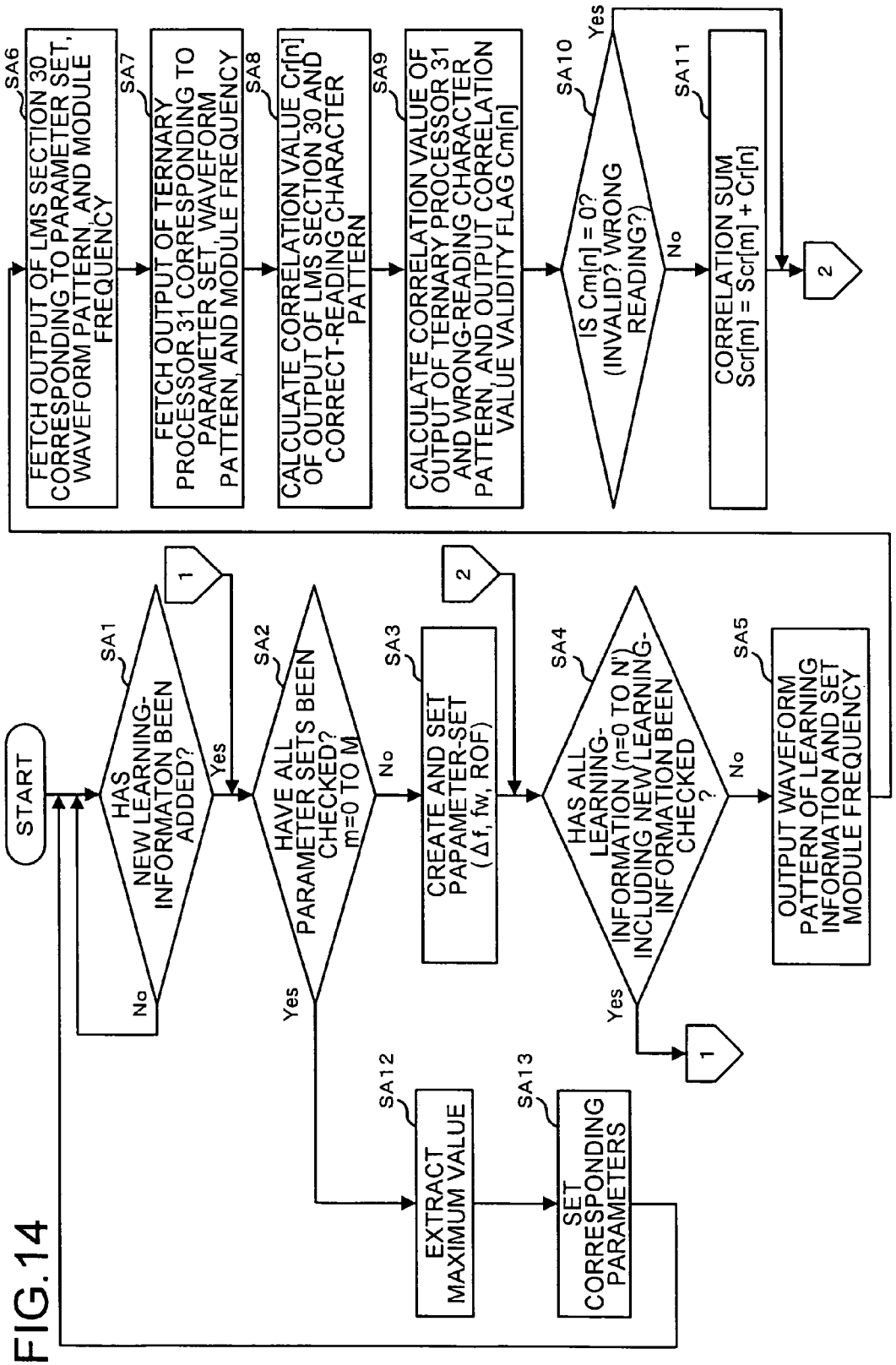
FIG. 14 is a flowchart of an operation of the first embodiment.

By doing so, the controller 38 makes a judgment result at step SA1 shown in FIG. 14 as "Yes". At step SA2, the controller 38 judges whether all the parameter sets (m=0 to M) in the parameter-set table 54 in the parameter-information database 50 shown in FIG. 2 are checked, and in this case the judgment result is "No".

At step SA3, the controller 38 creates one parameter-set (in this case, $\Delta f[0]$, fw[0], ROF[0]) from the parameter-set table 54. Then, the controller 38 causes the BPF 27 to set this parameter-set in the parameter setting section 37.

At step SA4, the controller 38 judges whether all the learning information (n=0 to N') in the learning-information database 60 shown in FIG. 4 is checked for the parameter set created at step SA3.

At step SA5, the controller 38 outputs a waveform pattern in the learning information of the record $60_0$ of the learning-information database 60 shown in FIG. 4 to the BPF 27 and the delay filter 29, and sets the module frequency in the BPF 27.

At step SA6, the signal of the waveform pattern is filtered based on the module frequency set at step SA5 and filter characteristics according to the parameters set at step SA3. Then, the correct-reading pattern correlator 33 fetches the output of the LMS section 30 based on the control of the controller 38.

At step SA7, the wrong-reading pattern correlator 32 fetches the output from the ternary processor 31 according to the control of the controller 38. At step SA8, the controller 38 generates the reference ternarized pattern from the correct-reading character pattern selected by the character selector 40, and sets it as the reference ternarized pattern in the correct-reading pattern correlator 33.

Figures 15, 16:
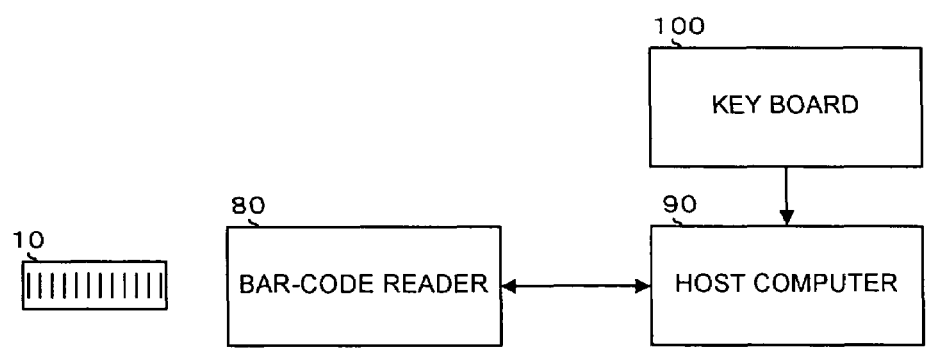
FIG. 15 illustrates a formula to calculate a correlation value.
FIG. 16 is a block diagram of a configuration of a second embodiment.

Thus, the correct-reading pattern correlator 33 calculates the correlation value Cr[n] of the reference ternarized pattern and the output from the LMS section 30 (refer to FIG. 15). In this correlation value Cr[n], xn(t) corresponds to the output from the LMS section 30 and yn(T−t) corresponds to the reference ternarized pattern.

At step SA9, if there is a wrong-reading ternarized pattern in the learning information (refer to FIG. 4), the controller 38 sets this wrong-reading ternarized pattern in the wrong-reading pattern correlator 32. Thus, the wrong-reading pattern correlator 32 calculates the correlation value of the output of the ternary processor 31 fetched at step SA7 and the wrong-reading ternarized pattern, using the calculating formula used in step SA8.

Next, if this correlation value is less than the threshold value, the controller 38 outputs a correlation value validity flag Cm[n] that shows validity of the correlation value from the correct-reading pattern correlator 33 as 1 (valid, correct reading), to the multiplier 34. At step SA10, a judgment of whether the correlation value validity flag Cm[n] is 0 (invalid, wrong reading) is made. In this case, since the correlation value validity flag Cm[n] is 1 (valid, correct reading), a judgment result at step SA10 is "No".

In the multiplier 34, a correlation value Cr[n] from the correct-reading pattern correlator 33 and the correlation value validity flag Cm[n] (=1) are multiplied. At step SA11, the adder 35 adds a correlation-sum Scr[m] related to the parameter set created at step SA3 to the abovementioned correlation value Cr[n], and updates the correlation-sum Scr[m].

On the other hand, if the correlation value exceeds the threshold value at step SA9, the controller 38 outputs the correlation value validity flag Cm[n] as 0 (invalid, wrong reading) to the multiplier 34. At step SA10, since the correlation value validity flag Cm[n] is 0 (invalid, wrong reading), the judgment result is "Yes" and step SA11 is skipped.

Practically, in the multiplier 34, the correlation value Cr[n] from the correct-reading pattern correlator 33 and the correlation value validity flag Cm[n] (=0) are multiplied, and the correlation value Cr[n] becomes 0. Therefore, in the adder 35, 0 is added to the correlation-sum Scr[m].

Thus, according to the first embodiment, in a certain parameter set, when a ternarized pattern that has a greater correlation value with the wrong-reading ternarized pattern, is output from the ternary processor 31, the correlation value Cr[n] at step SA8 is made 0 and without adding to the correlation-sum Scr[m], the filter set is not selected in an extraction of the maximum value at step SA12 (described later).

At step SA4, the controller 38 judges whether all the learning information, (n=0 to N') in the learning-information database 60 shown in FIG. 4 is checked for the parameter set created at step SA3, and in this case the judgment result is "No".

At step SA5, the controller 38 outputs a waveform pattern in the learning information of a next record 60, in the learning-information database 60 shown in FIG. 4 to the BPF 27 and the delay filter 29, as well as sets the module frequency in the BPF 27. After this, from step SA6 onwards, the process for the learning information related to the concerned parameter set is performed.

When processing of the last record $60_{N'}$ in the learning-information database 60 ends, the controller 38 makes a judgment result at step SA4 as "Yes". In this case, the correlation-sum Scr[m] for the parameter set mentioned above (in this case, $\Delta f[0]$, fw[0], and ROF[0]) is calculated.

At step SA2, the controller 38 judges whether all parameter sets (m=0 to M) in the parameter-set table 54 in the parameter-information database 50 shown in FIG. 2 are checked, and in this case the judgment result is "No".

At step SA3, the controller 38 creates the next parameter set (in this case, $\Delta f[0]$, fw[0], and ROF[0]) from the parameter-set table 54. Then, the controller 38 causes the BPF 27 to set this parameter-set in the parameter setting section 37. After this, a process of calculating the correlation-sum Scr[m] for the concerned parameter set ($\Delta f[0]$, fw[0], and ROF[0]) is performed.

Further, when a process of calculating the correlation sum Scr[m] for the last parameter set ends, the controller 38 makes the judgment result at step SA2 as "Yes". At this point, a plurality of correlation-sums Scr[m] corresponding to all parameter sets have been calculated.

At step SA12, the maximum-value extractor 36 extracts the maximum value from the plurality of correlation-sums Scr[m]. This maximum correlation-sum Scr[m] has the greatest correlation value with the reference ternarized pattern of correct reading, i.e. it expresses a parameter set for which an occurrence of wrong reading is the least.

At step SA13, the parameter setting section 37 sets a parameter set corresponding to the maximum correlation-sum Scr[m] extracted at step SA12, in the BPF 27. By substituting the parameter set for which the wrong reading has occurred, the bar code is read based on the parameter set mentioned above, for which the occurrence of wrong reading is the least.

As explained above, according to the first embodiment, when there is a wrong reading of characters of the bar code, the operator is made to select a correct-reading character from a plurality of characters in the character selector 40. Because the pattern for which the occurrence of wrong reading is the least is set in the BPF 27 based on a comparison result (correlation value) of the correct-reading ternarized pattern corresponding to the correct-reading character and a ternarized pattern acquired from a plurality of signal-waveform information while changing the parameters one by one, the reading accuracy improves automatically even while the bar code reader is being used (after the shipment).

In the first embodiment, the operator selects the correct reading character pattern, however, the correct reading character pattern may be input using a keyboard. An example of such a configuration is described below as a second embodiment of the present invention.

FIG. 16 is a block diagram of a configuration of the second embodiment. In this diagram, same reference numerals are used for components corresponding to the components in FIG. 1. In FIG. 16, a keyboard 100 is connected to the host computer 90. This keyboard 100 is for direct inputting of a character pattern from the bar code 10 by the operator when there are two types of reading results (correct-reading character pattern and wrong-reading character pattern).

In the configuration mentioned above, when there are two types of reading results of the bar code 10, the bar-code reader 80 informs it as a wrong reading to the operator via the host computer 90 (or directly). Accordingly, the operator inputs a character pattern that is displayed near the bar code 10 using the keyboard 100.

The host computer 90 informs the character pattern that is input as the correct-reading character pattern to the bar-code reader 80. Then, the bar-code reader 80 adds the learning information and performs resetting etc. of parameter set in a similar way as according to the first embodiment.

Thus as described above, according to the second embodiment, an effect similar to that according to the first embodiment is achieved.

Figure 17:
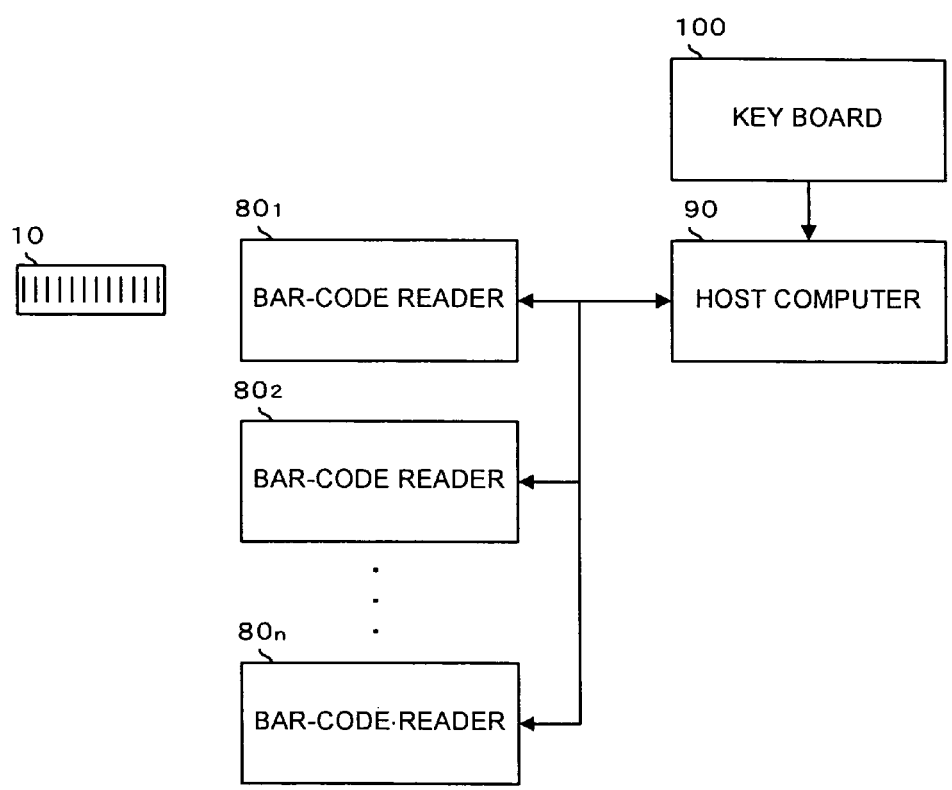
FIG. 17 is a block diagram showing a configuration of a third embodiment.

FIG. 17 is a block diagram of a configuration of a third embodiment according to the present invention. In this diagram, same reference numerals are used for components corresponding to the components in FIG. 16. In FIG. 17, bar-code readers $80_1$ to $80_n$ connected in parallel are provided instead of the bar-code reader 80 shown in FIG. 16. Each of the bar-code readers $80_1$ to $80_n$ has the same configuration as that of the bar-code reader 80.

In the configuration mentioned above, for example, if there is a wrong reading in the bar-code reader $80_1$ and the parameter set is reset, this parameter set is set in parallel in the other bar-code readers $80_2$ to $80_n$.

Thus, as described above, according to the third embodiment, because the parameter setting is performed also in the other bar-code readers $80_2$ to $80_n$ which are installed as annex to the bar-code reader $80_1$, parameters for which the occurrence of wrong reading is the least can be set promptly in a plurality of bar-code readers, thereby improving efficiency.

According to the first embodiment, although the configuration is such that the bar-code reader 80 is provided with functions such as a bar-code reading function, a function of making the operator select the correct-reading character pattern when read wrongly, and a function of resetting the parameter set, some functions may also be provided to the host computer.

Figure 18:
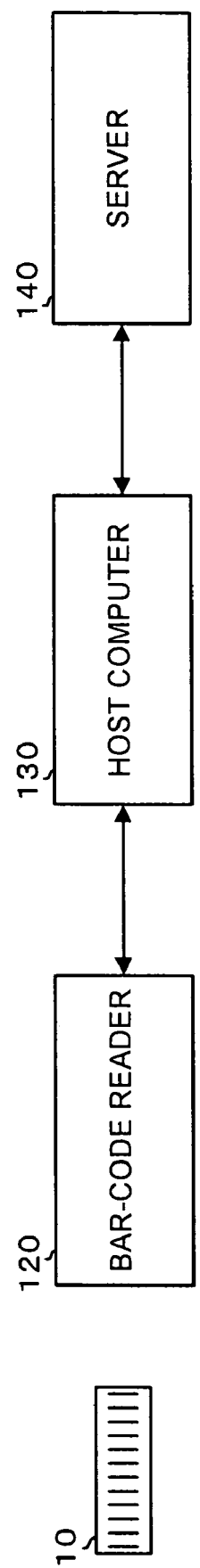
FIG. 18 is a block diagram of a configuration of a fourth embodiment.

FIG. 18 is a block diagram of a configuration of a fourth embodiment according to the present invention. A bar-code reader 120 according to the fourth embodiment is provided with the bar-code reading function and the function of resetting the parameter set. A host computer 130 receives a bar-code reading result from the bar-code reader 120, and is provided with the function of making the operator select the correct-reading character pattern when read wrongly. A server 140 includes the parameter-information database 50 and the learning-information database 60 shown in FIG. 1, and receives a request of referring to a database, from the bar-code reader 120 via the host computer 130.

According to the fourth embodiment, an effect similar to that in the first embodiment is achieved.

Although the embodiments from the first to the fourth embodiments have been described so far by referring to the diagrams, a concrete example of configuration is not restricted to any of the embodiments from the first to the fourth embodiments and a design modification etc. within a scope that is not deviated from the basic idea of the present invention is included in the present invention.

A program for realizing the bar-code reading function mentioned above may be recorded in a computer readable recording medium 300 shown in FIG. 19. A computer 200 may be caused to read and to execute the computer program recorded in the recording medium 300, thereby realizing each function.

The computer 200 includes a CPU (Central Processing Unit) 210 that runs the abovementioned program, an input device 220 such as a keyboard and a mouse, a ROM (Read Only Memory) 230 that stores various types of data, a RAM (Random Access Memory) 240, a reading device 250 that reads the program from the recording medium 300, an output device 260 such as a display and a printer, and a bus 270 that connects each component of the apparatus.

The CPU 210 reads the program recorded in the recording medium 300 via the reading unit 250 and runs the program, thereby realizing each of the functions mentioned above. An optical disc, a flexible disc, and a hard disc etc. are examples of the recording medium 300.

Thus as described above, according to the present invention, when there is an occurrence of wrong reading of characters of a bar code, the operator is made to select the correct-reading character from the plurality of characters. Because the pattern for which the occurrence of wrong reading is the least is set based on the comparison result of the pattern corresponding to the correct-reading character and the pattern acquired from the plurality of signal-waveform information while changing the parameters one by one, the reading accuracy improves automatically even while the bar code reader is being used.

Moreover, according to the present invention, the pattern corresponding to the correct reading character and the pattern acquired from the plurality of signal-waveform information while changing the parameters one by one, are correlated. Therefore, based on the correlation value, the reading accuracy improves automatically even while the bar code reader is being used.

Moreover, according to the present invention, because the parameter corresponding to the correlation of the maximum value is set as the parameter for which the occurrence of wrong reading is the least, the reading accuracy improves automatically even while the bar code reader is being used.

Moreover, according to the present invention, the parameters are set in the other bar-code readers that are installed as annex. Therefore, when there is an occurrence of wrong reading in any of the bar-code readers from among the plurality of bar-code readers, parameters for which the occurrence of wrong reading is the least can be set promptly, thereby improving the efficiency.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A bar-code reader comprising:
   a reading unit that based on parameters reads characters from a bar code;
   a storing unit that stores a plurality of signal-waveform information corresponding to a plurality of character patterns;
   a selecting unit with which an operator can select a correct-reading character from among a plurality of characters, if there is an occurrence of a wrong reading;
   a comparing unit that compares a pattern corresponding to the correct-reading character selected and a pattern acquired from a plurality of signal-waveform information while one by one changing the parameter selected; and
   a parameter-setting unit that sets in the reading unit the parameters for which the occurrence of the wrong reading is least, based on a comparison result of the comparing unit.

2. The bar-code reader according to claim 1, wherein the comparing unit performs the comparison by correlating the pattern corresponding to the correct-reading character selected and the pattern acquired from the plurality of signal-waveform information while changing the parameters one by one.

3. The bar-code reader according to claim 2, wherein the parameter-setting unit sets in the reading unit, those parameters corresponding to a correlation having a maximum value, as the parameters for which the occurrence of the wrong reading is the least.

4. The bar-code reader according to claim 1, wherein there are a plurality of bar-code readers installed in parallel, and the parameter-setting unit sets the parameters in all the bar-code readers.

5. A computer-readable recording medium that records therein instructions which, when executed, cause a computer to execute:
   reading characters from a bar code, based on parameters;
   storing a plurality of signal-waveform information corresponding to a plurality of character patterns;
   a selecting that includes making an operator select a correct-reading character from among a plurality of the characters, if there is an occurrence of wrong reading;
   comparing a pattern corresponding to the correct-reading character selected and a pattern acquired from a plurality of signal-waveform information while changing the parameters one by one; and
   setting in the reading, the parameters for which the occurrence of the wrong reading is least, based on a comparison result of the comparing.

6. A bar-code reader comprising:
   a database that includes a plurality of records each of which including a waveform corresponding to a bar code, a correct reading data corresponding to the waveform, and a wrong reading data corresponding to the waveform;
   a filtering unit that filters the waveform based on a preset parameter to output a filtered waveform;
   a correlation-value calculating unit that calculates, for each of the records, a correlation value between the filtered waveform and the correct reading data;
   a correlation-sum calculating unit that adds up the correlation values of the records to calculate a correlation-sum;
   a parameter-value determining unit that determines an optimum value of the preset parameter maximizing the correlation-sum; and
   a parameter-value setting unit that sets the optimum value to the preset parameter.

7. The bar-code reader according to claim 6, wherein the correlation-sum calculating unit adds up a part of the correlation values.

8. The bar-code reader according to claim 6, wherein the parameter-value setting unit sets the optimum value to the preset parameter when a new record is added to the database due to a wrong reading.

9. The bar-code reader according to claim 6, further comprising a transmitting unit that transmits the optimum value to another bar-code reader.

* * * * *